(12) United States Patent
Berthelot et al.

(10) Patent No.: US 9,405,734 B2
(45) Date of Patent: Aug. 2, 2016

(54) IMAGE MANIPULATION FOR WEB CONTENT

(71) Applicant: Reflektion, Inc., San Mateo, CA (US)

(72) Inventors: David Berthelot, San Mateo, CA (US);
Michael Dixon, Sunnyvale, CA (US);
Rajeev Madhavan, Atherton, CA (US);
Mercedes Mapua, San Mateo, CA (US);
Patrick Mihelich, San Francisco, CA (US); Win Min, Daly City, CA (US);
Hamid Savoj, Los Altos Hills, CA (US);
Hsiao-Ping Tseng, Fremont, CA (US);
James D Tucek, Foster City, CA (US)

(73) Assignee: Reflektion, Inc., San Mateo, CA (US)

( * ) Notice: Subject to any disclaimer, the term of this patent is extended or adjusted under 35 U.S.C. 154(b) by 181 days.

(21) Appl. No.: 14/142,326

(22) Filed: Dec. 27, 2013

(65) Prior Publication Data
US 2014/0189476 A1   Jul. 3, 2014

Related U.S. Application Data

(60) Provisional application No. 61/746,156, filed on Dec. 27, 2012.

(51) Int. Cl.
| | |
|---|---|
| *G06F 17/00* | (2006.01) |
| *G06F 17/21* | (2006.01) |
| *G06F 17/30* | (2006.01) |
| *G06T 11/00* | (2006.01) |
| *G06T 11/60* | (2006.01) |

(52) U.S. Cl.
CPC ........ *G06F 17/212* (2013.01); *G06F 17/30017* (2013.01); *G06T 11/001* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 5,434,957 | A * | 7/1995 | Moller | G09G 5/06 345/593 |
| 7,443,544 | B2 * | 10/2008 | Waksman | H04N 1/6016 358/3.01 |
| 7,895,570 | B2 | 2/2011 | Gibson et al. | |
| 7,912,831 | B2 | 3/2011 | Joshi et al. | |
| 7,975,020 | B1 | 7/2011 | Green et al. | |
| 8,065,620 | B2 | 11/2011 | Chen et al. | |
| 8,086,662 | B1 | 12/2011 | Doyle et al. | |
| 8,166,155 | B1 | 4/2012 | Rachmeler et al. | |
| 8,176,417 | B2 | 5/2012 | Underhill et al. | |

(Continued)

OTHER PUBLICATIONS

US 7,933,839, 4/2011, Siegel et al. (withdrawn).

(Continued)

*Primary Examiner* — Keith Bloomquist
(74) *Attorney, Agent, or Firm* — Bruce A. Young

(57) ABSTRACT

A web page or group of pages can be automatically generated based on images selected by a user. The images are analyzed for color and groups of colors for the page background and image framing are determined. Images are analyzed to determine the shapes of the images and the images are placed within appropriate shapes on a page on the web. Click-through rate can be estimated for images and this click-through rate used during the web page generation. Important sections are evaluated in the images and cropping may occur for the images on a page. Text and video can be part of the web page. Software applications can be accessed from the web page as well. The online web pages can be tailored for presentation on a mobile device.

22 Claims, 5 Drawing Sheets

(56) References Cited

U.S. PATENT DOCUMENTS

| | | |
|---|---|---|
| 8,200,775 B2 | 6/2012 | Moore |
| 8,234,174 B1 | 7/2012 | Eagon et al. |
| 8,508,547 B2 | 8/2013 | Klassen et al. |
| 8,587,604 B1 | 11/2013 | Kanter et al. |
| 8,588,522 B2 | 11/2013 | Bhatti et al. |
| 8,593,478 B2 | 11/2013 | O'Brien-Strain et al. |
| 8,606,733 B2 | 12/2013 | Marchesotti et al. |
| 2003/0037074 A1* | 2/2003 | Dwork .............. G06F 17/30864 715/229 |
| 2006/0256134 A1* | 11/2006 | Widdowson .................. 345/629 |
| 2008/0155422 A1* | 6/2008 | Manico et al. ................ 715/731 |
| 2008/0304518 A1* | 12/2008 | Cheng .................... H04L 67/20 370/474 |
| 2011/0124415 A1 | 5/2011 | Shimono |
| 2012/0105467 A1* | 5/2012 | Chao et al. .................... 345/589 |
| 2012/0254733 A1 | 10/2012 | Tucovic |
| 2012/0265819 A1* | 10/2012 | McGann et al. .............. 709/204 |
| 2012/0294514 A1* | 11/2012 | Saunders et al. ............. 382/159 |
| 2013/0317833 A1 | 11/2013 | Davis |
| 2013/0322750 A1 | 12/2013 | Agarwal et al. |
| 2014/0105488 A1* | 4/2014 | Geng ................ G06F 17/30864 382/161 |
| 2014/0169684 A1* | 6/2014 | Samii ................... G06K 9/6202 382/218 |

OTHER PUBLICATIONS

Reinhard, Erik, et al. "Color transfer between images." Computer Graphics and Applications, IEEE 21.5 (2001): 34-41.

* cited by examiner

IMAGE MANIPULATION FOR WEB CONTENT

RELATED APPLICATIONS

This application claims the benefit of U.S. provisional patent application "Image Manipulation for Web Magazine Content" Ser. No. 61/746,156, filed Dec. 27, 2012. The foregoing application is hereby incorporated by reference in its entirety.

FIELD OF ART

This application relates generally to generating web content and more particularly to image manipulation for web content.

BACKGROUND

Sharing stories is a fundamental part of human nature. Throughout history, various storytelling formats have evolved including various images from cave paintings through magazines and books. With the advent of the Internet, image and text-rich content on the World Wide Web transforms story sharing into an even more compelling user experience. At one extreme, professional web designers and layout specialists use advanced tools to create visually compelling web pages. However, the use of such tools typically requires expert knowledge of both the tools and of design concepts and techniques. At the other extreme, numerous laypeople publish content through social networks. Professional web designers and layout specialists use their expert knowledge of advanced tools to create content that presents stories via an arrangement of text and images.

As Internet-connected devices proliferate, the opportunities for publishers to distribute their web pages or magazines, and thus sell ad space, increases. Those opportunities further multiply as more web pages are published, discussed, and shared via social media.

Readers enjoy the convenience and aesthetics of web sites and online magazines. Tablet computers are an increasingly popular way of accessing the Internet and reading web sites. With this technological proliferation, advertisers who buy ad space in web formats can increasingly reach not only a mobile and highly connected audience, but also an audience viewing content on the high-resolution, vivid displays found in modern tablet computers. The color and clarity of such displays, in addition to the interactivity possible on tablet computers, allow advertisers to present attractive and engaging advertisements in web magazines.

Publishers of web sites can sell advertising space to advertisers according to any of a number of revenue models. Some revenue models are geared toward paying for exposure, such as cost per mille (CPM) and cost per view (CPV). Other revenue models are geared toward paying for performance, such as cost per click (CPC) and cost per action (CPA). Publishers may be able to charge a premium for advertising space that allows for behavior-targeted advertisements, semantic advertising, location-based advertising, and so on.

In addition, a subscriber base can provide a relatively stable and engaged audience. This stability is valuable because it allows advertisers to expose the audience to advertising campaigns over an extended period of time—thus increasing the advertisement's likelihood of success.

SUMMARY

A computer can be employed to generate aesthetically pleasing web content, which can include content such as images, text, video, apps, and so on. The computer composes the web content in response to the aesthetic qualities of at least the images. Optionally, a user interface is provided to allow a user to select or enter images, text, or other content and to guide the operation of the computer. Although some embodiments described herein allow for a layperson to readily create a web magazine or other content, other embodiments include advanced tools intended for use by professional web designers or others with a high degree of skill or experience creating web magazines. A computer-implemented method for document generation is disclosed comprising: receiving a selection of a plurality of images; analyzing colors in the plurality of images to determine a palette; generating a palette based on the analyzing of the colors in the plurality of images; analyzing shapes of the plurality of images to determine a theme; and generating a page including the plurality of images wherein the page is based on the palette and the theme. The theme may include dimensions for the plurality of images. The aspect ratios may be based on content in the plurality of images. The method may further comprise evaluating saliency. The palette may include a background color for the page and/or a color for a frame around one of the plurality of images. The palette may be determined based on an analysis of being statistically pleasing.

In embodiments, a computer program product embodied in a non-transitory computer readable medium for image manipulation comprises: code for receiving a selection of a plurality of images; code for analyzing colors in the plurality of images to determine a palette; code for generating a palette based on the analyzing of the colors in the plurality of images; code for analyzing shapes of the plurality of images to determine a theme; code for estimating a predicted click-through rate for each of the plurality of images for a given user; and code for generating a page including the plurality of images wherein the page is based on the palette and the composition theme. In some embodiments, a computer system for image manipulation comprises: a memory which stores instructions; one or more processors coupled to the memory wherein the one or more processors are configured to: receive a selection of a plurality of images; analyze colors in the plurality of images to determine a palette; generate a palette based on the analyzing of the colors in the plurality of images; analyze shapes of the plurality of images to determine a composition theme; estimating a predicted click-through rate for each of the plurality of images for a given user; and generate a page including the plurality of images wherein the page is based on the palette, the predicted click through rate, and the composition theme.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Experts using professional design tools are able to produce a wide variety of aesthetically pleasing web pages. Laypeople, however, often lack the training and experience required to effectively and efficiently use professional design tools. As a result, laypeople who want to create aesthetically pleasing web pages are currently limited in the designing of pages. And, as a consequence of laypeople's often limited design abilities, produced pages can appear aesthetically grating. For example, colors or textures in a user-uploaded image may clash with colors or textures in the page. One of the main concerns with user-designed pages is that the success of a design hinges on the user's aesthetic sensibility, and requires that the user spend a significant amount of time configuring possibilities. By configuring a computer with the abilities to recognize aesthetic qualities of content and to generate web pages in response to those aesthetic qualities, it is possible to enable laypeople and experts alike to produce aesthetically pleasing web pages in less time than previously required. In embodiments of the present disclosure, the computer formats web pages for a web site and allows the user to provide the web site contents to others. Furthermore, the web site may include advertisements, or may charge subscription fees, enabling the user to capitalize on the publication of the web site.

Figure 1:
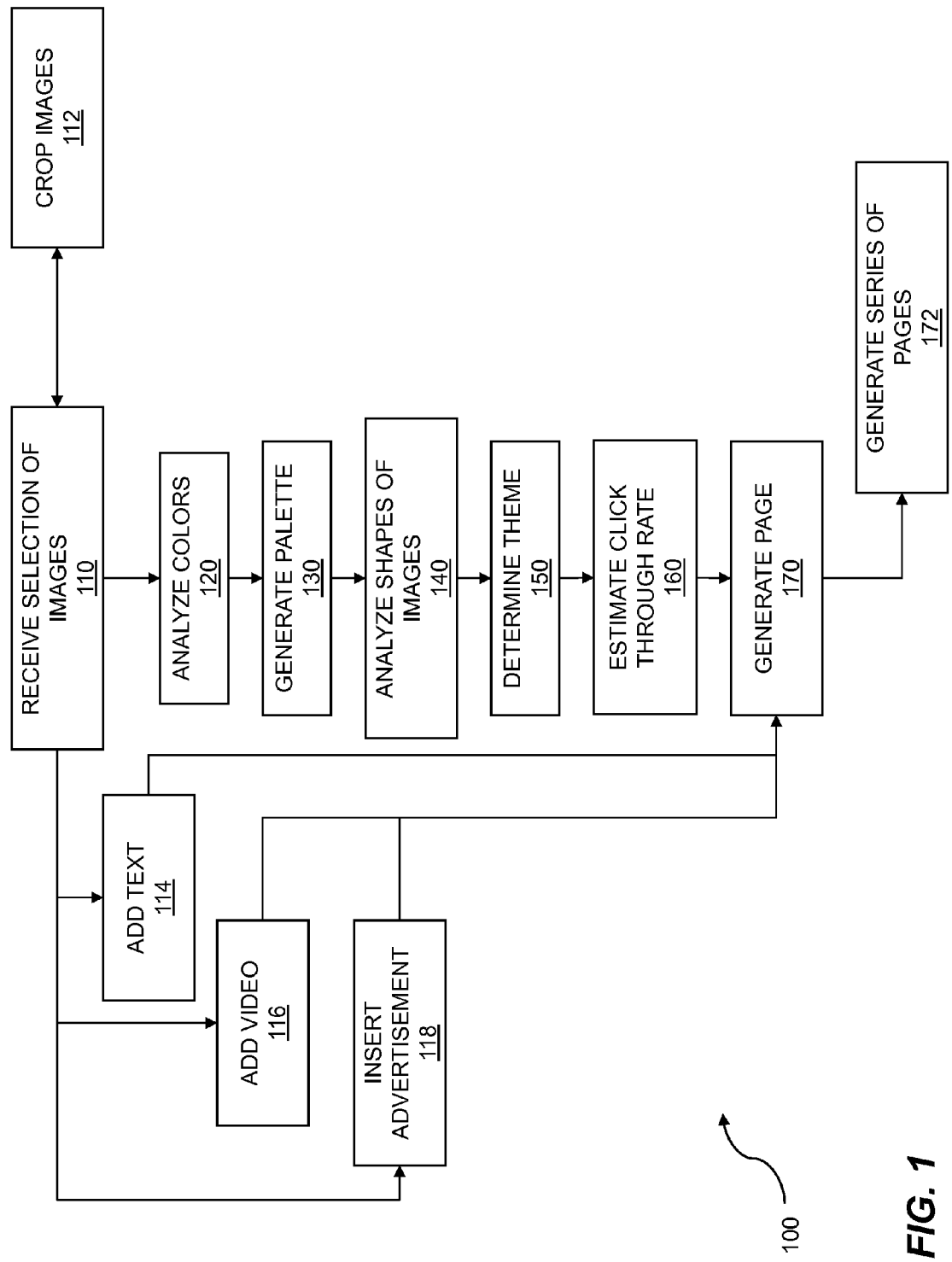
FIG. 1 is a flow diagram for document generation.

FIG. 1 is a flow diagram for document generation. In embodiments the document includes a representation of a web page or online magazine, blog, or other such content. The document may be formatted for viewing in a web browser, a mobile application, or the like. The document may be encoded to adapt its visual presentation in response to the type or screen size of the device on which the document is viewed.

The flow 100 comprises receiving a selection of a plurality of images 110. The images may be associated with a user's account, a topic, a calendar date, a sequence of events, and so on. The images may be received from any of a number of sources including a camera, a photo sharing service, a social network, and so on. In embodiments, receiving the images includes utilizing an authorization provided by a user that enables a computer receiving the images to access the images on behalf of the user operating from a remote server. In some embodiments, the images include a streamed video, which may include a thumbnail image that, when selected by a user, causes the video to stream. Selection may occur by mousing over or having the mouse over an image. The various images may be associated with a given link for further information, another web page, or the like. The link may correspond to an advertisement or other source of information.

The flow 100 includes analyzing colors 120 in the plurality of images to determine a palette, and generating a palette 130 based on the analyzing of the colors in the plurality of images. The generated palette may include a blend, selection, subset, or other set of colors related to the determined palette. The generated palette may be related to the determined palette via a function, a lookup table, or the like. For example, and without limitation, the generated palette may include a master palette, an adaptive palette, and so on. The generating of a palette can include evaluation of the occurrence rate of various colors and the determination of dominant colors in the images to be included in a web page.

In some embodiments, the pixels in an image are grouped based on k-means clustering in color space or other analysis techniques into eight groups. The average color for each octant can then be determined. The eight average colors (one for each octant) that form the color palette are extracted to represent the color space of the image. These eight colors of one palette can be mapped to a new palette to provide a pleasant visual effect.

The color palette for the image set can be computed by comparing to other palettes finding a minimum cost bipartite-matching between two color sets and thereby select the best matches. In embodiments, original image colors can be retargeted to better match the selected palette. The color retargeting is accomplished by converting the images to CIE-Lab color space and computing the mean and standard deviation of each of the three main color channels. A linear transform can be applied to each channel so that their means and standard deviations would be shifted and rescaled to match the desired target distributions. In some embodiments, the mean and standard deviation of five palette colors in CIE-Lab color space is computed. In embodiments, an aggregate mean and standard deviation for three CIE-Lab channels can be selected across selected images. In some embodiments, different images may be weighted differently. In embodiments, different images may be weighted equally although there can be an accounting for dimensions so that larger images do not contribute more to the aggregate statistics than smaller images. Thresholds may be added to limit how much the mean and standard deviation for each channel can be adjusted for a particular image. These threshold limits can prevent distorted final colors for images with significantly different color distributions. In some cases extra constraints can be used to ensure the linear transform didn't cause extreme color alterations when the images and selected palette were significantly different from one another. In other embodiments, a YCbCr color space may be used.

The flow 100 includes analyzing shapes of the plurality of images 140 to determine a composition theme 150. The theme may include a set of shapes, backgrounds, images, background textures, placeholders for images, or the like. The placeholders can, without limitation, indicate placement for the plurality of images—including, in embodiments, location, orientation, and size of images to be inserted later. The placeholders can include dimensions for the plurality of images, aspect ratios for the plurality of images (which may be based on content in the plurality of images), and so on. The images to be inserted later may be a subset of the previously analyzed plurality of images, and the theme may indicate placement for the subset of the plurality of images.

The flow 100 further comprises estimating a predicted click-through rate 160 for each of the plurality of images. The click through rate can be estimated for a given user or a given user demographic. In many cases a textual description is associated with images that are to be included in the web page content. Based on historical experience with an image, a type of image, the textual description, or the like a click-through rate can be estimated. A given user may have a history for clicking on a certain type of image, e.g. an outdoors aficionado may have a propensity to click on advertisements relating to camping equipment. Likewise, a certain demographic may have a history for clicking on a certain type of image, e.g. an upper-income type person may have a tendency to click on luxury car advertisements. Based on information understood about the user, the click through rate can then be evaluated.

The flow 100 comprises generating a page 170 including the plurality of images wherein the page is based on the palette, the predicted click through rate, and the composition theme. The generated page can be aesthetically pleasing by having a certain color palette. The color palette can include a certain background color, as well as texture or design, for the page. The page can have links to advertisements and other sources of information with the links associated with images on the page. The images selected for inclusion on the page can be those with a certain click through rate, e.g. a high click through rate for certain advertisements. The page can have a certain number of images with the images being of certain sizes and having certain aspect ratios to make the page pleasing to the eye. The page can be tailored to the most likely viewing device, e.g. tablet, laptop, mobile phone, etc.

In embodiments, the page contains computer readable code that, when interpreted or executed, causes a web page to be displayed on a screen, printed to a page, or the like. Embodiments of the page include HTML, CSS, Javascript™, Adobe™ Flash codes, PDF files, styles, text, images, videos, application software, or the like. The page can be a single file, a conjunction of multiple files, an association of multiple files stored on one server or across a plurality of servers, and so on. In some embodiments, the page is optimized for viewing on a mobile device. Those skilled in the art will appreciate a variety of possible embodiments of a page.

The flow 100 may further comprise generating a series of pages 172 that are part of the online web site or magazine. The series of pages 172 may be related sequentially, via a web of hyperlinks, spatially (e.g. such that a user can browse left, right, up, or down to get to the next or previous page), temporally (e.g. such each page in the series of pages is viewable at a particular time or only for a particular period of time), and so on.

The flow 100 may further comprise cropping an image 112. The generating of a page 170 or a series of pages 172 may include inserting the cropped image into the generated page according to the determined theme. In embodiments, the cropping is based upon saliency; that is, at least one salient feature of an image remains while other non-salient features of an image are cropped out. Salient features may include those that are distinct and representative (or locally complex and globally discriminative), such as features detectable using the Kadir-Brady saliency detector, its progeny, and the like. In other embodiments, the cropping is based upon face detection, such that some faces are deliberately cropped or not cropped.

The flow 100 includes adding text 114 to one or more of the plurality of images. In embodiments, the text is retrieved from a remote server such as a web or file server, is manually entered by a user, or is input using a different method. The text may include an annotation, footnote, body of an article, and so on. In specific embodiments, the text is juxtaposed with, adjacent to, or superimposed on any of images in accordance with the palette and theme of the page. The flow 100 includes adding video 116 to one or more of the plurality of images. The video may be retrieved from a remote server such as a web or file server, included from a local disk drive, and so on.

The flow 100 further includes inserting an advertisement 118 on the page. In embodiments the advertisement is pushed onto the page from a remote server. The advertisement can be time sensitive, targeted, and so on. The advertisement can include text, images, video, and the like, and is inserted in accordance with the palette, the theme of the page, or some other criteria for insertion. In addition to images, text, video, and advertisements, other items can be included in the online web site, such as application software. Application software, or "Apps" as they are commonly referred to, are often sourced from the online provider, an advertiser, or a third party. Just as an image from a series of images can be selected and included in the online magazine, so an app from a group of apps can be selected and included. In embodiments, an app could be pushed to a by a third party. In some cases, a plurality of apps can be included in a web site or even on a single web page. The app can be executed or invoked by clicking on a location on a page, by mousing over a portion of a page, by viewing a page, by keyboard selection, by analysis of eye tracking, or by some other human interface capability. The app could include JavaScript™, a link, or other web or code capability.

The flow may include applying a filter to one or more of the plurality of images. The filter can be selected to enhance or diminish an aspect of the images. For example, in embodiments the filter can deemphasize non-salient features or irrelevant faces in the image, emphasize salient features or relevant faces in the image, and the like. In embodiments, filters cause an image to have different effects such as an antique appearance, a focus effect, a contrast/brightness effect, a lens effect, or another alteration. Those skilled in the art will appreciate a variety of image filters. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
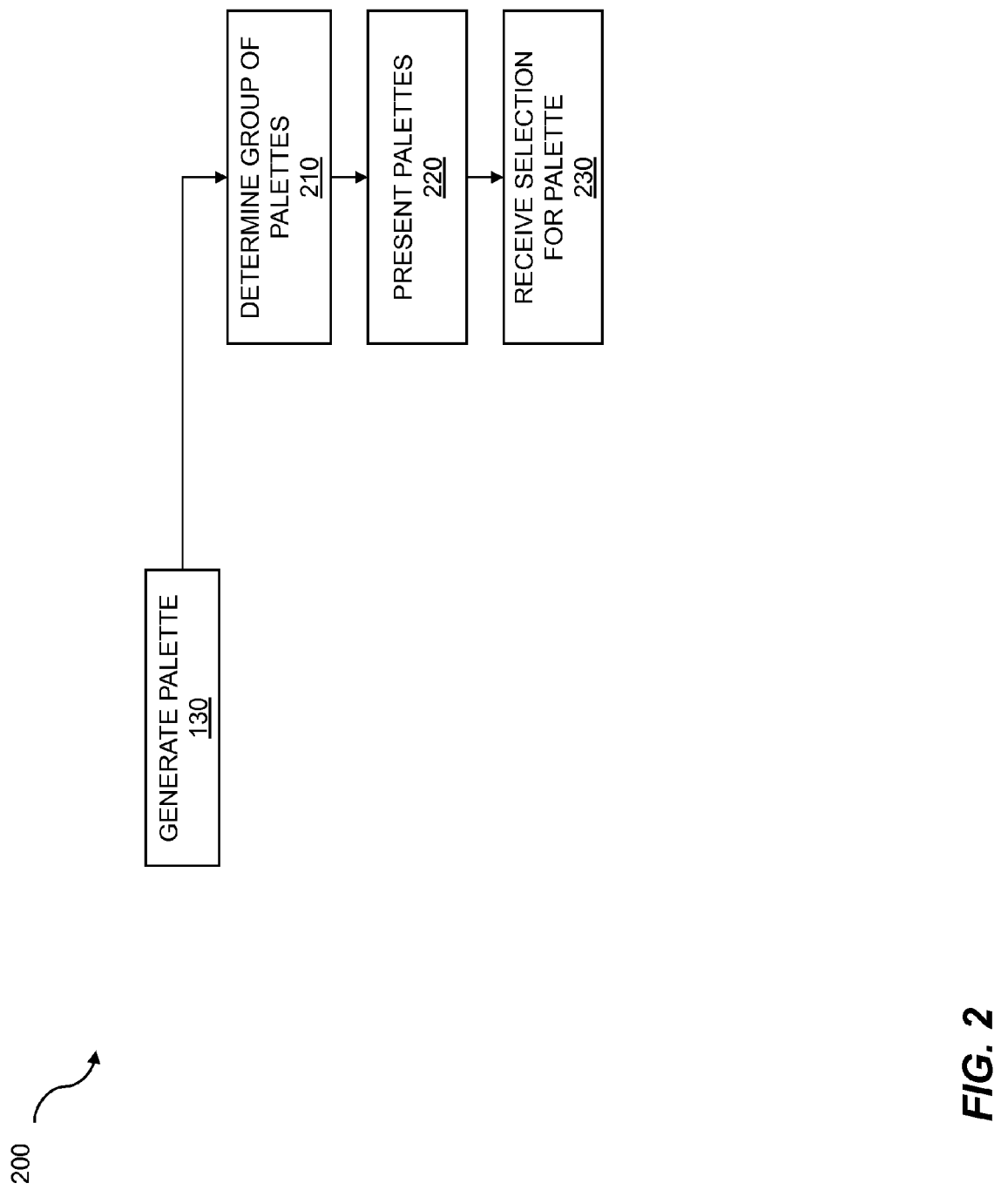
FIG. 2 is a flow diagram for color analysis.

FIG. 2 is a flow diagram for color analysis. A flow 200 may continue from or be part of the previous flow 100 and can include generating a palette 130. The flow 200 describes a variety of aspects for palette generation. The flow 200 includes determining a group of palettes 210 from which a user can select. Determining the group of palettes 210 can include analyzing colors in a plurality of images to determine a palette and generating a palette or selecting a pre-existing palette based on the analyzing of the colors in the plurality of images. The flow 200 includes presenting a subset of the group of palettes 220 to the user. This presenting can include causing a computer, which may be remote, to display the subset of the group of palettes to the user. The group of palettes can be shown sequentially, in smaller images of the page to be generated or in another manner. The flow 200 includes receiving a selection for one of the subset of the group of palettes 230. Receiving the selection may include receiving an indication that the user has selected one of the subset of the group of palettes. The selection may be from a mouse indication, keyboard usage, a touch screen, or some other human interface capability.

In embodiments, the palette is determined based on an analysis of being statistically pleasing. For example and without limitation, analyzing colors in the plurality of images can include cleaning up the images in preparation for feature detection, converting at least parts of the images into sets of features, and comparing the sets of features to data known to correspond to particular palettes, wherein comparing the sets of features includes employing a monotonic similarity function—such as a Mahalanobis distance—that outputs the similarity between the sets of features to the data known to correspond to particular palettes. In this example, a statistically pleasing analysis is evidenced by variances and covariances of the Mahalanobis distance being good estimates given the sets of features and the data known to correspond to particular palettes. Those skilled in the art will appreciate other methods of the palette being determined based on an analysis of being statistically pleasing.

In embodiments, the palette includes a background color for the page; the palette can include a color for a frame around one of the plurality of images or the palette can use the color for the frame as a color for the frames around the plurality of images. In embodiments, the palette is based on a scoring for the plurality of images. For example and without limitation, the palette can be based on an evaluation of distances in a color space, such as a perceptually linear or other color space. In embodiments, the palette includes a texture for a background for the page. In embodiments, the palette includes a texture for one or more frames around the plurality of images, and so on. In some cases, using a palette can include modifying coloration for an image or a portion of an image. Various steps in the flow 200 may be changed in order, repeated, omitted, or the like without departing from the disclosed concepts. Various embodiments of the flow 200 may be included in a computer program product embodied in a non-transitory computer readable medium that includes code executable by one or more processors.

Figure 3:
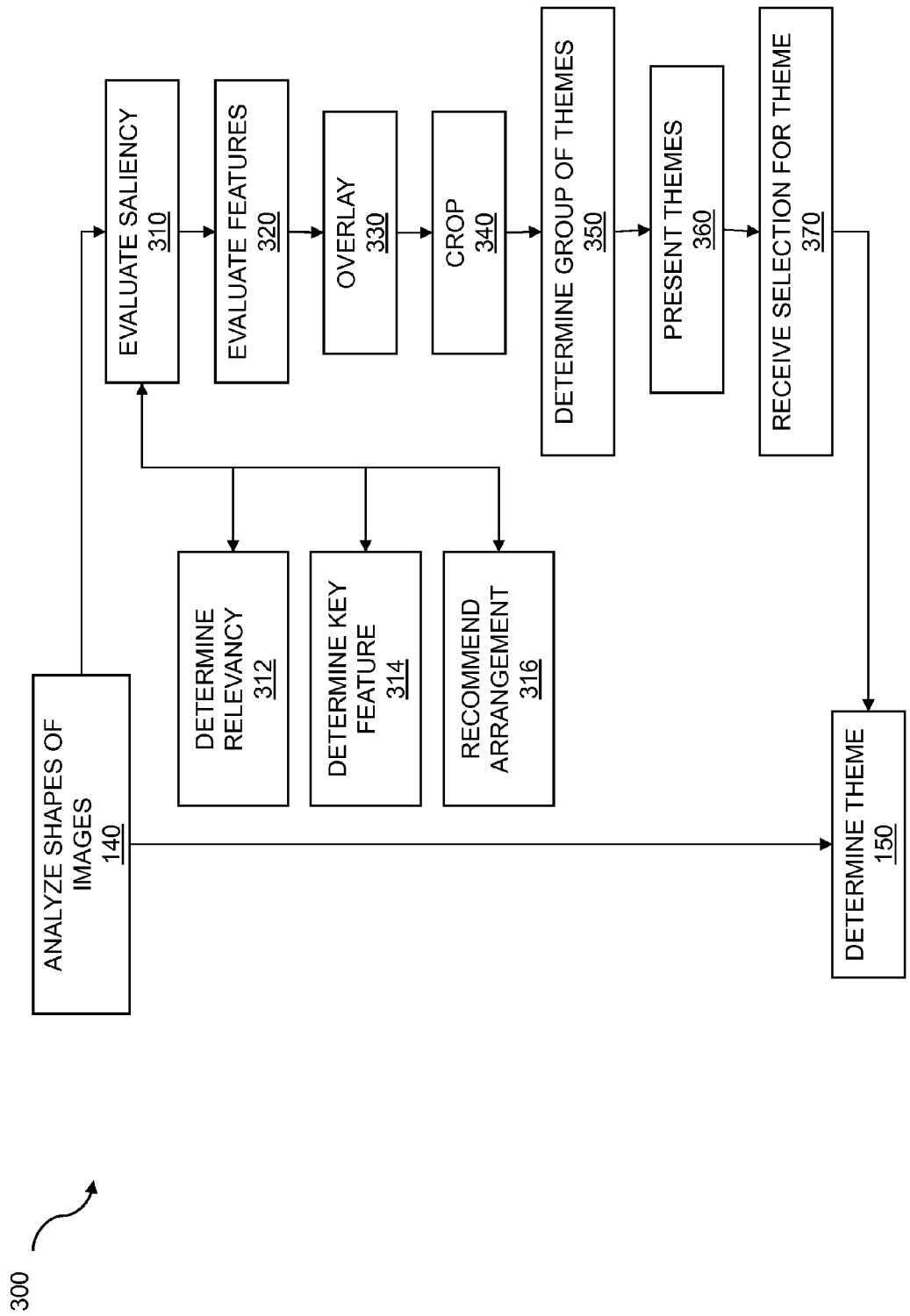
FIG. 3 is a flow diagram for shape analysis.

FIG. 3 is a flow diagram for shape analysis. A flow 300 can continue from or be part of the previous flow 100. The flow 300 describes various aspects of shape evaluation and can include analyzing the shapes of images 140. The flow 300 includes evaluating the saliency 310 of one or more of the plurality of images. Saliency can be used in cropping of an image and elsewhere. In some embodiments, evaluating the saliency 310 includes evaluating features 320 within the plurality of images to determine a salient part of a first image and a non-salient part of a second image.

The evaluating saliency 310 can include determining relevancy 312 for one or more of the plurality of images and emphasizing the one or more of the plurality of images that are most relevant to the theme for the page. In some cases multiple images will have been selected by a user. A subset of these images will be selected by the flow 300 and used in the page generation. The subset can be determined by the evaluation of those that are most relevant to the theme. The determining saliency 310 can include determining a key feature from one the plurality of images and emphasizing the key feature 314 on the page. By evaluating the plurality of images, an evaluation of a key feature between the various images. Based on this key feature, the images can be selected and arranged. The flow 300 can include recommending an arrangement 316 of the plurality of images based on the key feature that was determined. In some cases a user may provide input and select from a group of arrangements or approve an arrangement provided by the flow 300.

In such embodiments, generating the page includes overlaying 330 the salient part of the first image over the non-salient part of the second image such that at least some of the salient part occludes at least some of the non-salient part. The flow 300 includes cropping 340 one or more of the plurality of images. Portions of an image can be cropped so that important portions of an image are focused and unimportant portions are removed. The flow 300 further includes determining a group of themes 350 from which a user can select. The themes can include shapes of the images used on a page, aspect ratios of the images used, arrangements of the images, and so on. For example, a theme could include three images where two are square and the third is a landscape-oriented image. The theme, or group of themes, can be determined using a weighted function of information on the images. The flow 300 includes presenting a subset of the group of themes 360 to the user. The possible themes are, in some embodiments, shown sequentially or may be shown in smaller images of the page to be generated. The flow 300 further includes receiving a selection for one of the subset of the group of themes 370. The selection can be from a mouse indication, keyboard usage, a touch screen, or some other human interface capability. Based on the selection, the flow 300 includes determining the theme 150 for a page or series of pages on the web.

In some embodiments, the evaluating 310 of saliency includes identifying an important, prominent, or otherwise distinctive section for one or more of the plurality of images. The evaluating 310 of saliency can, in some embodiments, comprise performing face detection. In embodiments, the evaluating of saliency includes evaluating features within the plurality of images to determine a salient part of a first image and a non-salient part of a second image, wherein generating the page includes overlaying the salient part of the first image over the non-salient part of the second image such that at least some of the salient part occludes at least some of the non-salient part. Various steps in the flow 300 may be changed in order, repeated, omitted, or the like without departing from the disclosed concepts. Various embodiments of the flow 300 may be included in a computer program product embodied in a non-transitory computer readable medium that includes code executable by one or more processors.

Figure 4:
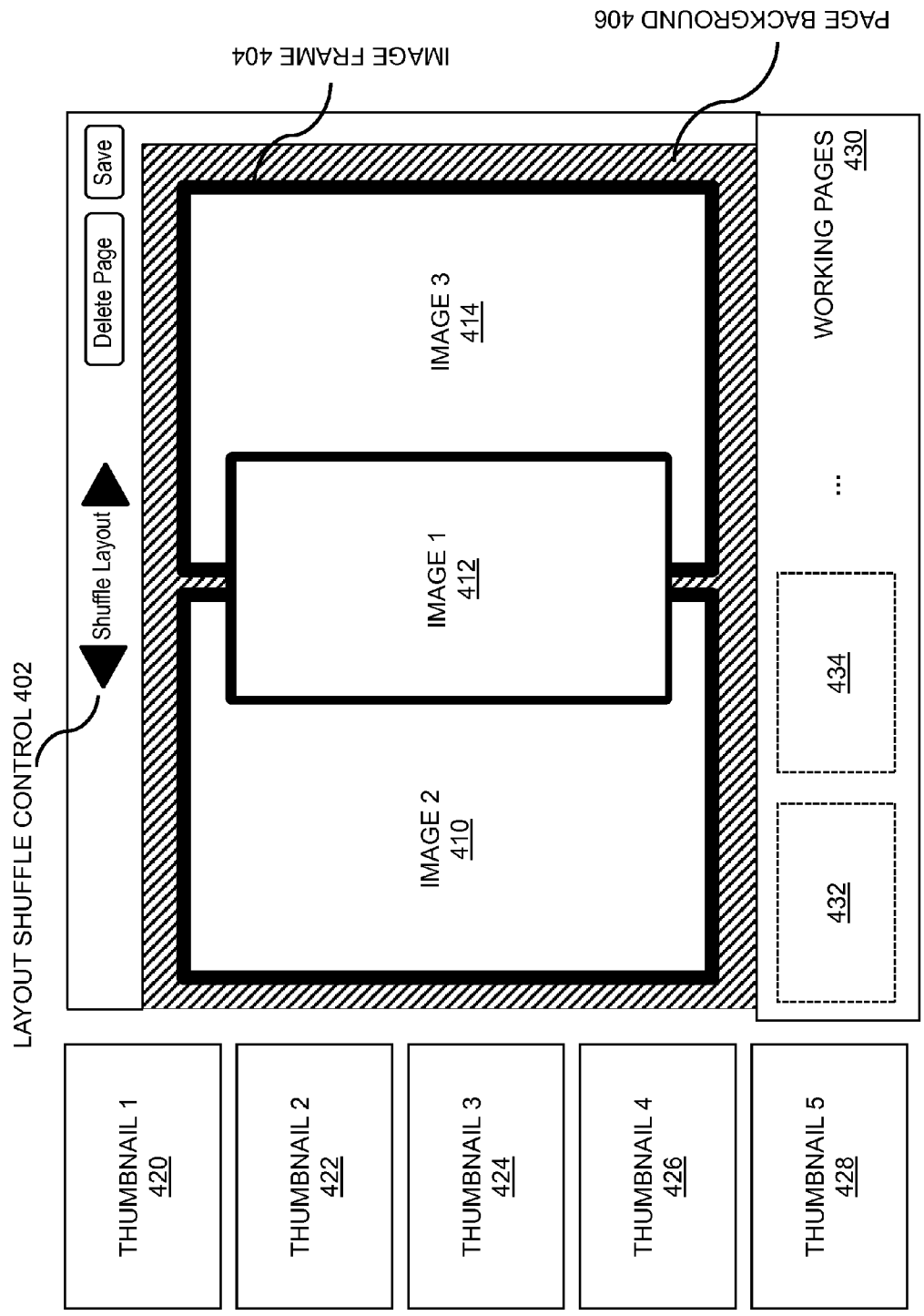
FIG. 4 is an example rendering for page generation.

FIG. 4 is an example rendering for page generation. The example includes a layout shuffle control 402, an image frame 404, a page background 406, a number of images (here labeled Image 2 410, Image 1 412, and Image 3 414) a plurality of thumbnails (here labeled Thumbnail 1 420, Thumbnail 2 422, Thumbnail 3 424, Thumbnail 4 426, and Thumbnail 5 428), and a plurality of working pages 430 (here labeled 432, 434, and so on). The example rendering includes a depiction of the palette, which in this example includes the page background 406 and a color used as a frame around the plurality of images 410, 412, 414. In embodiments, the palette includes a texture (such as a background texture, texture map, or the like) for one or more frames around the plurality of images. In some embodiments, the rendering presents a subset of the group of palettes to the user so that the user may select a palette from the subset. The example rendering shows Image 1 412 overlaid on Image 2 410 and Image 3 414. In embodiments, the overlaid Image 1 412 may include salient features that occlude non-salient features of the underlying Image 2 410 and Image 3 414, as can be seen in this example. In some embodiments, the rendering presents a subset of the group of themes to a user so that the user may select a theme from the subset.

As shown, the layout shuffle control 402 allows a user to alternate between different layout options selected and includes displaying various possible themes. For example, various layouts will include different numbers, placements, or orientations of images and the like. The image frame 404 can be a function of the theme, the palette, or the like. Each of the layout options can include its own frame parameters, such as frame width, shadow, gradient, texture, or the like. The page background 406 can include color, texture, image, or any fill that serves as or affects the background of the page. Those skilled in the art will appreciate a variety of layout options, frames, and backgrounds.

Figure 5:
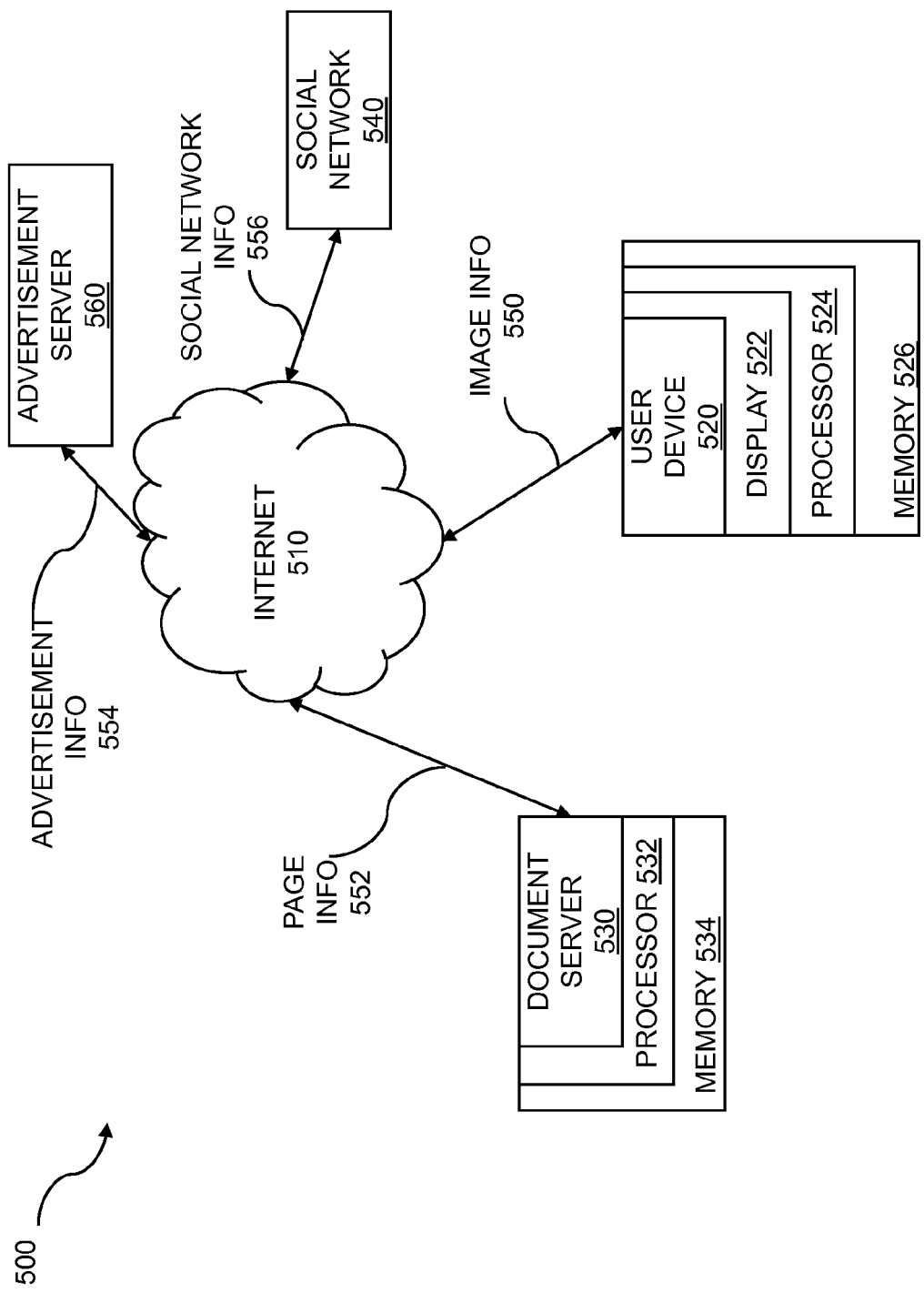
FIG. 5 is a system diagram for document generation.

FIG. 5 is a system diagram for document generation. The system 500 comprises a user device 520 and a document server 530 linked using the Internet 510 or another network to an advertisement server 560 and, in some embodiments, a social network 540. The user device 520 may communicate image information 550 with the document server 530, the social network 540, the advertisement server 560, or the like. The user device 520 may communicate page information 552 with the document server 530, social network 540, advertisement server 560, or the like. Social network information 556 can be obtained from the social network 540 and the social network information 556 can be used in document generation. Advertisement information 554, including advertisements and information about the advertisements, can be obtained from the advertisement server 560. This advertisement information 560 can be used in document generation. Any and all such communication may occur via the Internet 510.

The user device 520 includes a memory which stores instructions 526, and one or more processors 524 coupled to the memory 526. In embodiments, the one or more processors 524 are configured to perform any and all of the method steps described herein, including receiving a selection of a plurality of images, analyzing colors in the plurality of images to determine a palette, generating a palette based on the analyzing of the colors in the plurality of images, analyzing shapes of the plurality of images to determine a theme and generating a page including the plurality of images wherein the page is based on the palette and the theme, and so on.

The user device includes a display 522. The display may include any electronic display such as, and without limitation, a computer display, a laptop screen, a net-book screen, a tablet computer screen, a cell phone display, a mobile device display, a remote with a display, a television, a projector, or the like. The processor 524 may render on the display 522 a page generated in accordance with the systems and methods described herein. In embodiments, the user device 520 is a mobile device and the page or rendering of the page may be optimized for display on the mobile device.

The document server includes one or more processors 532 and memory 534 which stores instructions. In embodiments, the one or more processors 532 are configured to receive, host, generate, serve, or otherwise process, store, or transmit page information 552. The page information 552 may include application software for performing the methods described herein on the user device 520, on the document server 530, or the like; data used in generating pages such as the data known to correspond to particular palettes; the palettes themselves including any and all aspects of the palettes; and the like. The page information 552 may additionally or alternatively include generated pages, images for use in pages, information related to the generation of pages such as the selection of the plurality of images, the selection for one of the subset of a group of palettes, the selection for one of the subset of the group of themes, and so on.

The social network 540 may include a remote computer system that provides a social network-type service such as, and without limitation, FACEBOOK™, LINKEDIN™, TWITTER™, and so on. In embodiments, generated pages may be published to or received from the social network 540; in addition, page information 552 and image information 550 may be published to or received form the social network 540.

In some embodiments, the one or more processors, 524 or 532, are configured to insert an advertisement on a generated page. The advertisement server 560 may push the advertisement to the document server 530 or the user device 520. Without limitation, the advertisement may include a time-sensitive, location-sensitive, user-targeted message that is updated from time to time via a data push from the advertisement server 560. In embodiments, the user device 520 or the document server 530 transmits contextual information back to the advertisement server 560. This contextual information may include IP addresses; GPS location data; a time of day; a user identifier; an indication of the palette or theme of a generated page; an indication of the content of a generated page such as a tag, a content identifier, or the like; and so on.

The system 500 may include a computer program product embodied in a non-transitory computer readable medium for image manipulation including code for receiving a selection of a plurality of images, code for analyzing colors in the plurality of images to determine a palette, code for generating a palette based on the analyzing of the colors in the plurality of images, code for analyzing shapes of the plurality of images to determine a theme, and code for generating a page including the plurality of images wherein the page is based on the palette and the theme. Thus, the computer program product may be embodied solely within the user device 520, solely within the document server 530, distributed across both the user device 520 and the document server 530, in duplicate on both the user device 520 and the document server 530, and so on.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for document generation comprising:
   receiving a selection of a plurality of images;
   analyzing colors in the plurality of images to determine a palette;
   generating a palette based on the analyzing of the colors in the plurality of images;
   analyzing shapes of the plurality of images to determine a composition theme;
   estimating a predicted click through rate for each of the plurality of images for a given user based at least in part on history data of the given user; and
   generating a page including the plurality of images wherein the page is based on the palette, the predicted click through rate, and the composition theme;
   wherein the generating the palette comprises:
   grouping pixels in each image of the plurality of images into eight groups;
   computing an average color for each of the eight groups for each image of the plurality of images to create an image palette for each image of the plurality of images; and
   generating the palette by comparing the image palettes for the plurality of images using minimum cost bipartite-matching.

2. The method of claim 1 wherein the composition theme includes aspect ratios for the plurality of images.

3. The method of claim 2 further comprising cropping one or more of the plurality of images.

4. The method of claim 1 further comprising determining a group of themes from which a user can select.

5. The method of claim 1 further comprising evaluating saliency.

6. The method of claim 5 wherein the saliency includes determining relevancy for one or more of the plurality of images and emphasizing the one or more of the plurality of images that are most relevant to the composition theme for the page.

7. The method of claim 5 wherein the saliency includes determining a key feature from one the plurality of images and emphasizing the key feature on the page.

8. The method of claim 7 further comprising recommending an arrangement of the plurality of images based on the key feature that was determined.

9. The method of claim 7 wherein the evaluating saliency identifies an important section for one or more of the plurality of images.

10. The method of claim 7 wherein the evaluating saliency further comprises performing face detection.

11. The method of claim 7 wherein the evaluating saliency further comprises evaluating features within the plurality of images to determine a salient part of a first image and a non-salient part of a second image, wherein generating the page includes overlaying the salient part of the first image over the non-salient part of the second image such that at least some of the salient part occludes at least some of the non-salient part.

12. The method of claim 1 wherein the palette includes a background color for the page.

13. The method of claim 12 wherein the palette is based on an evaluation of distances in a perceptually linear color space.

14. The method of claim 1 further comprising determining a group of palettes from which a user can select.

15. The method of claim 14 further comprising presenting a subset of the group of palettes to the user.

16. The method of claim 15 further comprising receiving a selection for one of the subset of the group of palettes.

17. The method of claim 1 further comprising inserting an advertisement on the page.

18. The method of claim 1 wherein the page is generated to be optimized for a mobile device.

19. The method of claim 1 wherein the history data of the given user comprises past click-through information by the given user.

20. The method of claim 1 wherein the history data of the given user comprises demographic data about the given user.

21. A computer program product embodied in a non-transitory computer readable medium for image manipulation, the computer program product comprising:
- code for receiving a selection of a plurality of images;
- code for analyzing colors in the plurality of images to determine a palette;
- code for generating a palette based on the analyzing of the colors in the plurality of images;
- code for analyzing shapes of the plurality of images to determine a composition theme;
- code for estimating a predicted click through rate for each of the plurality of images for a given user based at least in part on history data of the given user; and
- code for generating a page including the plurality of images wherein the page is based on the palette, the predicted click through rate, and the composition theme;
- wherein the code for generating the palette comprises:
- code for grouping pixels in each image of the plurality of images into eight groups;
- code for computing an average color for each of the eight groups for each image of the plurality of images to create an image palette for each image of the plurality of images; and
- code for generating the palette by comparing the image palettes for the plurality of images using minimum cost bipartite-matching.

22. A computer system for image manipulation comprising:
- a memory which stores instructions;
- one or more processors coupled to the memory wherein the one or more processors are configured to:
  - receive a selection of a plurality of images;
  - analyze colors in the plurality of images to determine a palette;
  - generate a palette based on the analyzing of the colors in the plurality of images;
  - analyze shapes of the plurality of images to determine a composition theme;
  - estimate a predicted click through rate for each of the plurality of images for a given user based at least in part on history data of the given user; and
  - generate page including the plurality of images wherein the page is based on the palette, the predicted click through rate, and the composition theme;
  - wherein the generating the palette comprises:
  - grouping pixels in each image of the plurality of images into eight groups;
  - computing an average color for each of the eight groups for each image of the plurality of images to create an image palette for each image of the plurality of images; and
  - generating the palette by comparing the image palettes for the plurality of images using minimum cost bipartite-matching.

* * * * *